(12) United States Patent
Daikai et al.

(10) Patent No.: US 6,854,485 B2
(45) Date of Patent: Feb. 15, 2005

(54) VIBRATION ABSORBING HOSE

(75) Inventors: Eiichi Daikai, Inuyama (JP); Tetsuya Arima, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 269 days.

(21) Appl. No.: 10/058,103

(22) Filed: Jan. 29, 2002

(65) Prior Publication Data
US 2002/0144743 A1 Oct. 10, 2002

(30) Foreign Application Priority Data
Jan. 31, 2001 (JP) ........................................ 2001-024601

(51) Int. Cl.$^7$ ................................................. F16L 55/04
(52) U.S. Cl. ........................ 138/30; 138/126; 428/36.91
(58) Field of Search ................. 138/30, 126; 428/36.91

(56) References Cited

U.S. PATENT DOCUMENTS

| | | | | |
|---|---|---|---|---|
| 4,330,017 A | * | 5/1982 | Satoh et al. | 138/126 |
| 4,685,090 A | * | 8/1987 | Krevor | 367/20 |
| 5,158,113 A | * | 10/1992 | Ozawa et al. | 138/137 |
| 5,362,530 A | | 11/1994 | Kitami et al. | 428/36.2 |
| 5,660,210 A | * | 8/1997 | Ikeda et al. | 138/126 |
| 5,698,633 A | * | 12/1997 | Matsumoto et al. | 525/215 |
| 5,804,269 A | * | 9/1998 | Ozawa et al. | 428/36.91 |
| 6,068,026 A | | 5/2000 | Garois | 138/126 |
| 6,179,008 B1 | * | 1/2001 | Kawazura et al. | 138/125 |
| 6,209,587 B1 | * | 4/2001 | Hsich et al. | 138/137 |
| 6,263,920 B1 | * | 7/2001 | Hsich et al. | 138/137 |
| 6,407,166 B1 | * | 6/2002 | Wang et al. | 525/66 |
| 6,450,206 B2 | * | 9/2002 | Ishikawa et al. | 138/126 |
| 6,476,117 B1 | * | 11/2002 | Wang et al. | 524/504 |
| 6,679,295 B2 | * | 1/2004 | Daikai et al. | 138/126 |
| 6,745,796 B2 | * | 6/2004 | Ikemoto et al. | 138/126 |
| 2003/0034081 A1 | * | 2/2003 | Daikai et al. | 138/126 |

FOREIGN PATENT DOCUMENTS

EP 0959285 A1 11/1999

OTHER PUBLICATIONS

European Search Report dated May 15, 2002.

* cited by examiner

*Primary Examiner*—James Hook
(74) *Attorney, Agent, or Firm*—Armstrong, Kratz, Quintos, Hanson & Brooks, LLP

(57) ABSTRACT

A vibration absorbing hose excellent in vibration absorbing property, mounting stability and shape retaining property. The vibration absorbing hose comprises at least one rubber layer composed of a rubber composition having a storage elastic modulus (E') of 20 to 100 MPa at 200 Hz with an elongation strain of 0.1% at an ordinary temperature (about 20° C.), and a damping factor (tan δ) of not lower than 0.4.

7 Claims, 1 Drawing Sheet

VIBRATION ABSORBING HOSE

BACKGROUND OF THE INVENTION

1. Field of the Invention

The present invention relates to a vibration absorbing hose for automotive applications.

2. Description of the Art

Resin hoses are generally required to have a sufficient barrier property with respect to a medium flowing therein, so that resins excellent in barrier property are used as materials for the hoses. However, the resin hoses generally have a high rigidity, and disadvantageously cause noises due to vibrations thereof. Further, the resin hoses are less pliable and, hence, inferior in mounting stability.

On the other hand, rubber hoses are generally more flexible and pliable, but unsatisfactory in vibration absorbing property and shape retaining property.

In view of the foregoing, it is an object of the present invention to provide a vibration absorbing hose which is excellent in vibration absorbing property, mounting stability and shape retaining property.

SUMMARY OF THE INVENTION

In accordance with the present invention to achieve the aforesaid object, there is provided a vibration absorbing hose which comprises at least one rubber layer composed of a rubber composition having a storage elastic modulus (E') of 20 to 100 MPa at 200 Hz with an elongation strain of 0.1% at an ordinary temperature (about 20° C.), and a damping factor (tan δ) of not smaller than 0.4.

The inventors of the present invention conducted intensive studies on hose rubber layers to provide a vibration absorbing hose excellent in vibration absorbing property, mounting stability and shape retaining property. As a result, the inventors found that the aforesaid object can be achieved by employing a specific rubber composition having a storage elastic modulus (E') within a predetermined range and a damping factor (tan δ) within a predetermined range for formation of at least one rubber layer of the hose. Thus, the present invention has been attained.

The vibration absorbing hose preferably further comprises a reinforcing layer. In this case, the hose has greater strength and a further improved shape retaining property.

DETAILED DESCRIPTION OF THE PREFERRED EMBODIMENTS

The present invention will hereinafter be described in detail by way of embodiments thereof.

Figure 1:
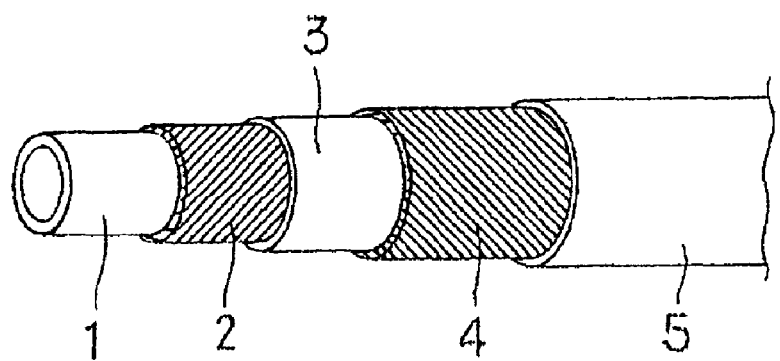
FIG. 1 is a diagram illustrating a vibration absorbing hose according to one embodiment of the present invention.

A preferred vibration absorbing hose according to the present invention includes an inner rubber layer 1, and a reinforcing layer 2, an intermediate rubber layer 3, an reinforcing layer 4 and an outer rubber layer 5 which are sequentially formed on the inner rubber layer 1 as shown in FIG. 1. It is a feature of the present invention that at least one of the inner rubber layer 1, the intermediate rubber layer 3 and the outer rubber layer 5 is composed of a specific rubber composition.

The specific rubber composition to be employed as the material for the at least one of the inner rubber layer 1, the intermediate rubber layer 3 and the outer rubber layer 5 has a storage elastic modulus (E') of 20 to 100 MPa at 200 Hz with an elongation strain of 0.1% at an ordinary temperature (about 20° C.), and a damping factor (tan δ) of not smaller than 0.4. Particularly, it is preferred that the storage elastic modulus (E') is 40 to 80 MPa, and the damping factor (tan δ) is not smaller than 0.6. If the storage elastic modulus (E') is smaller than 20 MPa, the resulting hose is inferior in shape retaining property. On the other hand, if the storage elastic modulus (E') is greater than 100 MPa, the resulting hose is inferior in vibration transmitting property. If the damping factor (tan δ) is smaller than 0.4, the resulting hose is inferior in vibration transmitting property.

Further, the rubber composition preferably has a 50% tensile stress (M50) of 1.0 to 4.0 MPa, more preferably 1.5 to 3.5 MPa. If the 50% tensile stress (M50) is smaller than 1.0 MPa, the resulting hose tends to have a poor sealing property with a sealing portion thereof having an insufficient compression stress. On the other hand, if the 50% tensile stress (M50) is greater than 4.0 MPa, the resulting hose may be less pliable and, hence, inferior in mounting stability.

The storage elastic modulus (E') and damping factor (tan δ) of the rubber composition can respectively be set in the aforesaid ranges by properly determining the type of rubber component, the types of additives blended with the rubber component, and proportions of the rubber component and the additives.

The rubber component is not particularly limited, but examples thereof include butyl rubber (IIR), halogenated butyl rubbers such as chlorinated butyl rubbers (Cl-IIR) and brominated butyl rubbers (Br-IIR), acrylonitrile-butadiene rubbers (NBR), acryl rubbers (ACM) and styrene-butadiene rubbers (SBR), which may be used either alone or in combination. Among these rubbers, butyl rubbers and halogenated butyl rubbers are preferred because of their excellent damping properties.

The additives to be blended with the rubber component are not particularly limited as long as they are typically used for ordinary rubber compositions. Examples of the additives include zinc oxide, stearic acid, carbon black, talc, a process oil and a vulcanizing agent, which may be used either alone or in combination.

The rubber composition can be prepared by blending the additives (zinc oxide, stearic acid, carbon black, talc, a process oil and/or an vulcanizing agent) with the rubber component, and kneading the resulting mixture by means of a mixer such as milling rolls, a kneader or a Banbury mixer.

The material for the reinforcing layers is not particularly limited, but examples thereof include reinforcing filaments such as of polyethylene terephthalate (PET) filaments, polyvinyl alcohol (vinylon) filaments, polyamide (nylon) filaments and aramid filaments. The formation of the reinforcing layers is not particularly limited, but may be achieved by spiral knitting or braiding of the reinforcing filaments.

The inventive vibration absorbing hose as shown in FIG. 1 is produced, for example, in the following manner. The rubber composition is extruded around a mandrel for formation of an inner rubber material layer, and then the reinforcing filaments are spirally wound around the inner rubber material layer for formation of the reinforcing layer 2. In turn, the rubber composition is extruded around the reinforcing layer 2 for formation of an intermediate rubber material layer, and then the reinforcing filaments are spirally wound around the intermediate rubber material layer for formation of the reinforcing layer 4. Further, the rubber composition is extruded around the reinforcing layer 4 for formation of an outer rubber material layer. Thereafter, these layers are heated under predetermined conditions, and then the mandrel is removed. Thus, the vibration absorbing hose (see FIG. 1) is provided, which includes the inner rubber layer 1, and the reinforcing layer 2, the intermediate rubber layer 3, the reinforcing layer 4 and the outer rubber layer 5 sequentially formed on the inner rubber layer 1.

In the aforesaid vibration absorbing hose production method, the aforesaid specific rubber composition is employed for the formation of the inner rubber layer 1, the intermediate rubber layer 3 and the outer rubber layer 5, but at least one of the inner rubber layer 1, the intermediate rubber layer 3 and the outer rubber layer 5 may be composed of the specific rubber composition.

Where a rubber composition other than the aforesaid specific rubber composition (i.e., at least one of the storage elastic modulus (E') and damping factor (tan δ) thereof falling outside the aforesaid range) is employed for the formation of any of the rubber layers, a value M calculated from the following expression (1) is preferably 1.5 to 3.5 MPa, more preferably 1.8 to 3.0 MPa. If the value M is smaller than 1.5 MPa or greater than 3.5 MPa, the resulting hose tends to be inferior in sealing property and mounting stability.

$$M = (Ma50 \times A + Mb50 \times B + Mc50 \times C + \ldots)/(A+B+C \ldots) \quad (1)$$

(wherein Ma50, Mb50, Mc50, ... are 50% tensile stresses of rubber compositions composing the respective rubber layers, and A, B, C, ... are cross-sectional areas of the respective rubber layers)

More specifically, where Ma50, Mb50 and Mc50 are 50% tensile stresses of the inner rubber layer 1, the intermediate rubber layer 2 and the outer rubber layer 3, respectively, and A, B and C are cross-sectional areas of the inner rubber layer 1, the intermediate rubber layer 3 and the outer rubber layer 5, respectively, it is preferred that the value M calculated from $M = (Ma50 \times A + Mb50 \times B + Mc50 \times C)/(A+B+C)$ is 1.5 to 3.5 MPa.

The thicknesses of the respective rubber layers of the vibration absorbing hose are not particularly limited. The inner rubber layer 1 typically has a thickness of 0.3 to 5.0 mm, preferably 0.8 to 2.5 mm. The intermediate rubber layer 3 typically has a thickness of 0.05 mm to 1.5 mm, preferably 0.1 to 0.5 mm, and the outer rubber layer 5 typically has a thickness of 0.5 to 5.0 mm, preferably 0.8 to 1.5 mm. The vibration absorbing hose typically has an inner diameter of 3 to 45 mm, preferably 5 to 20 mm.

The construction of the inventive vibration absorbing hose is not limited to that shown in FIG. 1. For example, the vibration absorbing hose may be of a single layer structure comprising a single rubber layer, or of a double layer structure comprising an inner rubber layer and an outer rubber layer. Further, the vibration absorbing hose is not necessarily required to have the reinforcing layers, but the provision of the reinforcing layers is preferred for further improvement of the strength and shape retaining property of the hose.

The inventive vibration absorbing hose can advantageously be used as a hose for an air-conditioner. In addition, the inventive hose can be used as an automotive fuel hose, an air hose, as well as hoses for an engine-cooling system (a radiator and a heater), a power steering system, an automatic transmission system and a braking system.

Next, an explanation will be given to Examples and Comparative Examples.

Prior to the explanation of Examples and Comparative Examples, the components employed in these Examples are as set forth below.

Chlorinated butyl rubber (Cl-IIR)
    HT1066 available from JSR Corp.
Butyl rubber (IIR)
    BUTYL 365 available from JSR Corp.
EPDM
    EP103AF available from JSR Corp.
Zinc oxide
    Zinc oxide Type-II.
Stearic acid
    LUNAC S30 available from Kao Soap Co., Ltd.
Carbon black
    CEAST SO available from Tokai Carbon Co.
Talc
    MISTRON VAPOR available from Nippon Mistron Co., Ltd.
Process oil
    Naphthenic oil (DIANAPROCESS NM300 available from Idemitsu Kosan Co., Ltd.)
Vulcanizing agent
    Alkylphenol-formaldehyde resin (TACKIROL 201 available from Taoka Chemical Co., Ltd.)
Vulcanizing agent
    Sulfur.

Preparation of Rubber Compositions (A) to (C) and (a) to (c)

Rubber compositions were each prepared by blending ingredients in proportions as shown in Table 1, and kneading the resulting mixture by means of milling rolls. The storage elastic moduli (E') of the rubber compositions at 200 Hz with an elongation strain of 0.1% at an ordinary temperature (20° C.) and the damping factors (tan δ) and 50% tensile stresses (M50) of the rubber compositions are also shown in Table 1.

TABLE 1

| | (parts by weight) Rubber composition | | | | | |
|---|---|---|---|---|---|---|
| | A | B | C | a | b | c |
| Cl-IIR | 50 | 50 | 75 | 100 | 25 | — |
| IIR | 50 | 50 | 25 | — | 75 | — |
| EPDM | — | — | — | — | — | 100 |

TABLE 1-continued

|  | (parts by weight) Rubber composition | | | | | |
| --- | --- | --- | --- | --- | --- | --- |
|  | A | B | C | a | b | c |
| Zinc oxide | 5 | 5 | 5 | 5 | 5 | 5 |
| Stearic acid | 1 | 1 | 1 | 1 | 1 | 1 |
| Carbon black | 40 | 40 | 40 | 50 | 50 | 100 |
| Talc | 60 | 80 | 80 | 60 | — | — |
| Process oil | 5 | 5 | 5 | 5 | 5 | 90 |
| Vulcanizing agent | 12 | 12 | 12 | 12 | 12 | — |
| Vulcanizing agent (sulfur) | — | — | — | — | — | 1 |
| Vulcanization accelerator | — | — | — | — | — | 4 |
| E' (MPa) | 42 | 64 | 78 | 130 | 18 | 10 |
| tan δ | 0.68 | 0.68 | 0.67 | 0.61 | 0.61 | 0.15 |
| M50 (MPa) | 2.5 | 2.6 | 3.3 | 4.1 | 1.4 | 1.0 |

EXAMPLE 1

The rubber composition (A) was extruded to a thickness of 1.8 mm around a mandrel for formation of an inner rubber material layer, and then 3000-denier PET filaments were spirally wound around the inner rubber material layer for formation of a reinforcing layer. The rubber composition (A) was extruded to a thickness of 1.1 mm around the reinforcing layer for formation of an outer rubber material layer. These layers were heated at 160° C. for 45 minutes, and then the mandrel was removed. Thus, a hose (inner diameter: 15.0 mm, outer diameter: 22.5 mm) was obtained, which had an inner rubber layer, the reinforcing layer provided around the inner rubber layer and an outer rubber layer provided around the reinforcing layer.

EXAMPLES 2 to 4 and COMPARATIVE EXAMPLES 1 and 2

Hoses were produced in substantially the same manner as in Example 1, except that different types of rubber compositions were used as materials for the inner rubber layer and the outer rubber layer as shown in Table 2.

Properties of the hoses of the Examples and the Comparative Examples were evaluated in the following manner. The results are shown in Table 2.

Vibration Absorbing Property

Figure 2:
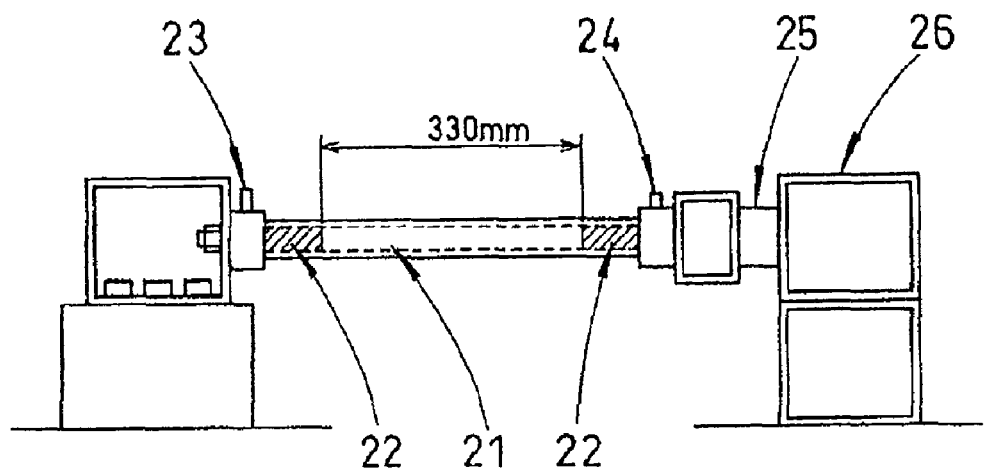
FIG. 2 is a diagram for explaining how to evaluate a vibration absorbing property.

By means of a tester as shown in FIG. 2, the vibration absorbing property of each of the hoses (denoted by a reference numeral 21 in FIG. 2) was evaluated with opposite ends of the hose 21 being fixed to metal cores 22 and with a middle portion thereof kept straight. A frequency of 200 Hz, an acceleration of 3 G, a free length of 330 mm, an inner pressure of 0.49 MPa and a twist angle of zero degree were employed as measuring conditions. In FIG. 2, shown are an acceleration ($A_0$) meter 23 provided at a vibrator side, an acceleration ($A_1$) meter 24 provided at a vibration receiving side, a rubber member 25, and a platen box 26. In Table 2, symbol ○ indicates that the vibration absorbing property was excellent with an attenuation factor of not greater than −10 dB, symbol Δ indicates that the vibration absorbing property was intermediate with an attenuation factor of greater than −10 dB and smaller than 0 dB, and symbol × indicates that the vibration absorbing property was poor with an attenuation factor of not smaller than 0 dB.

Mounting Stability

The hoses were each placed on a pair of rollers spaced by 200 mm, and a repulsive load was measured by pressing a middle portion of the hose at 500 mm/min for evaluation of the mounting stability of the hose. In Table 2, symbol ○ indicates that the mounting stability was excellent with a repulsive load of not greater than 15 N, symbol Δ indicates that the mounting stability was intermediate with a repulsive load of greater than 15 N and not greater than 25 N, and symbol × indicates that the mounting stability was poor with a repulsive load of greater than 25 N.

Shape Retaining Property

For evaluation of the shape retaining property of each of the hoses, a bending radius at which the flatness ratio of the outer diameter of the hose was reduced to not greater than 75% was measured. In Table 2, symbol ○ indicates that the shape retaining property was excellent with a bending radius of not greater than R80, symbol Δ indicates that the shape retaining property was intermediate with a bending radius of greater than R80 and not greater than R120, and symbol × indicates that the shape retaining property was poor with a bending radius of greater than R120.

TABLE 2

|  | Example | | | | Comparative Example | |
| --- | --- | --- | --- | --- | --- | --- |
|  | 1 | 2 | 3 | 4 | 1 | 2 |
| Type of rubber composition |  |  |  |  |  |  |
| Inner rubber layer | A | B | C | A | a | b |
| Outer rubber layer | A | B | C | c | a | b |
| Vibration absorbing property | ○ | ○ | ○ | ○ | Δ | ○ |
| Mounting stability | ○ | ○ | ○ | ○ | X | ○ |
| Shape retaining property | ○ | ○ | ○ | ○ | ○ | X |
| M (MPa) | 2.5 | 2.6 | 3.3 | 1.8 | 4.1 | 1.4 |

As can be understood from the results shown in Table 2, the hoses of the Examples are excellent in vibration absorbing property, mounting stability, shape retaining property, because at least one of the inner rubber layer and the outer rubber layer is composed of the specific rubber composition. On the other hand, the hose of Comparative Example 1 is inferior in vibration absorbing property and mounting stability, and the hose of Comparative Example 2 is inferior in shape retaining property, because neither of the inner rubber layer nor the outer rubber layer of those hoses are composed of the specific rubber composition.

As described above, the vibration absorbing hoses according to the present invention are excellent in vibration absorbing property, mounting stability and shape retaining property, because at least one rubber layer thereof is composed of the rubber composition having a storage elastic modulus (E') of 20 to 100 MPa at 200 Hz with an elongation strain of 0.1% at an ordinary temperature, and a damping factor (tan δ) of not lower than 0.4.

Further, the vibration absorbing hoses having the reinforcing layer in addition to the rubber layer are further advantageous with a higher strength and a further improved shape retaining property.

What is claimed is:

1. A vibration absorbing hose defined by an elongated hollow structure having means forming opening at opposite ends thereof for the conduct of mediums through said hose, said structure being constructed substantially entirely of rubber composition and comprising at least one layer composed of a rubber composition having a storage elastic modulus (E') of 20 to 100 MPa at 200 Hz with an elongation strain of 0.1% at an ordinary temperature, and a damping factor (tan δ) of not smaller than 0.4.

2. A vibration absorbing hose as set forth in claim 1, wherein the rubber composition has a 50% tensile stress (M50) of 1.0 to 4.0 MPa.

3. A vibration absorbing hose as set forth in claim 1, further comprising a reinforcing layer.

4. A vibration absorbing hose defined by an elongated hollow structure having means forming openings at opposite ends thereof for the conduct of mediums therethrough, said structure being constructed substantially entirely of rubber composition and comprising a plurality of rubber layers, at least one of the rubber layers being composed of a rubber composition having a storage elastic modulus (E') of 20 to 100 MPa at 200 Hz with an elongation strain of 0.1% at an ordinary temperature, and a damping factor (tan δ) of not smaller than 0.4.

5. A vibration absorbing hose as set forth in claim 4, wherein the rubber composition has a 50% tensile stress (M50) of 1.0 to 4.0 MFa.

6. A vibration absorbing hose as set forth in claim 4, wherein a value M calculated from the following expression (1) is 1.5 to 3.5 Mpa:

$$M = (Ma50 \times A + Mb50 B + Mc50 C + \ldots)/(A + B + C \ldots) \quad (1)$$

(wherein Ma50, Mb50, Mc50, . . . are 50% tensile stresses of rubber compositions composing the respective rubber layers, and A, B, C, . . . are cross-sectional areas of the respective rubber layers).

7. A vibration absorbing hose as set forth in claim 4, further comprising a layer of reinforcing filaments provided between each adjacent pair of rubber layers.

* * * * *

UNITED STATES PATENT AND TRADEMARK OFFICE
CERTIFICATE OF CORRECTION

PATENT NO. : 6,854,485 B2
DATED : February 15, 2005
INVENTOR(S) : Daikai et al.

It is certified that error appears in the above-identified patent and that said Letters Patent is hereby corrected as shown below:

<u>Column 7,</u>
Line 3, change "opening at" to be -- openings at --

<u>Column 8,</u>
Line 7, change "4.0 MFa" to be -- 4.0 MPa --
Line 10, change "3.5 Mpa" to be -- 3.5 MPa --
Line 11, change "M=(Ma50xA+Mb50B+Mc50C+...)/(A+B+C...)"
to be -- M=(Ma50xA+Mb50xB+Mc50xC+...)/(A+B+C...) --

Signed and Sealed this

Twelfth Day of July, 2005

JON W. DUDAS
*Director of the United States Patent and Trademark Office*